United States Patent [19]
Ciotola

[11] Patent Number: 4,993,720
[45] Date of Patent: Feb. 19, 1991

[54] SELF-SEALING MECHANICAL SEAL GLAND FOR PUMPS AND OTHER MACHINERY

[76] Inventor: Alfredo A. Ciotola, 1060 Revere Ave., Bronx, N.Y. 10465

[21] Appl. No.: 232,438
[22] Filed: Aug. 15, 1988
[51] Int. Cl.⁵ .................... F16J 15/02; F16J 15/14
[52] U.S. Cl. ................... 277/27; 277/72 FM; 277/73; 277/81 R; 277/93 SD
[58] Field of Search ............ 277/27, 81 R, 72 R, 277/72 FM, 73, 74, 71, 93 R, 93 SD; 285/96, 106

[56] References Cited

U.S. PATENT DOCUMENTS

| | | | |
|---|---|---|---|
| 954,668 | 4/1910 | Cable et al. | 285/96 X |
| 1,889,606 | 11/1932 | Lange | 285/96 X |
| 3,081,821 | 3/1963 | Hamilton | 277/72 X |
| 3,091,470 | 5/1963 | Anderson et al. | 277/73 |
| 3,183,007 | 5/1965 | Tann | 277/72 FM X |
| 3,259,390 | 7/1966 | Sanford | 277/73 X |
| 3,331,610 | 7/1967 | Olson | 277/71 |
| 3,860,270 | 1/1975 | Arnold | 277/206 R X |
| 3,910,587 | 10/1975 | Loeffler | 277/74 X |
| 3,944,263 | 3/1976 | Arnold | 285/96 |
| 4,305,593 | 12/1981 | Smith | 277/27 X |
| 4,832,351 | 5/1989 | Ciotola | 277/81 R |

FOREIGN PATENT DOCUMENTS

| | | | |
|---|---|---|---|
| 699930 | 11/1940 | Fed. Rep. of Germany | 277/73 |
| 453817 | 6/1968 | Switzerland | 285/96 |
| 1536683 | 12/1978 | United Kingdom | 285/96 |

*Primary Examiner*—Allan N. Shoap
*Attorney, Agent, or Firm*—Mathews, Woodbridge & Collins

[57] ABSTRACT

An improved "infield" cylindrical sealing gland which is constructed to be secured in mating relation providing a positive seal to the pump housing to supplement a sealing assembly for pumps and other machinery, including rotating shafts. The contacting surface of the gland in face-to-face relation to the pump housing is provided with one or more annular grooves in which are seated O-rings which bear against the surface of the pump housing. Structure is provided to interpose a viscous liquid into the grooves to produce hydraulic pressure against the internal surfaces of the O-rings compressing them against the surface of the pump housing in order to compensate for mismatches in the surfaces caused by corrosion, or other discrepancies.

7 Claims, 6 Drawing Sheets

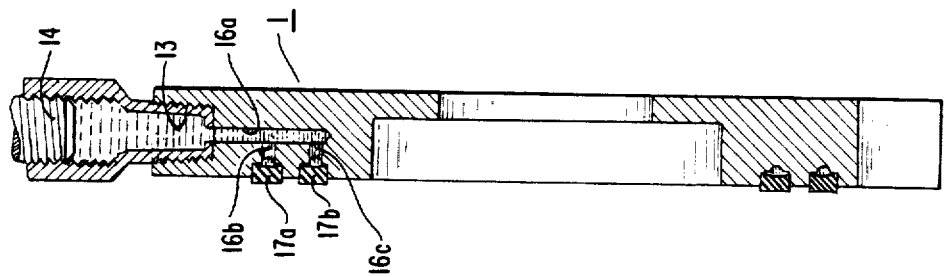
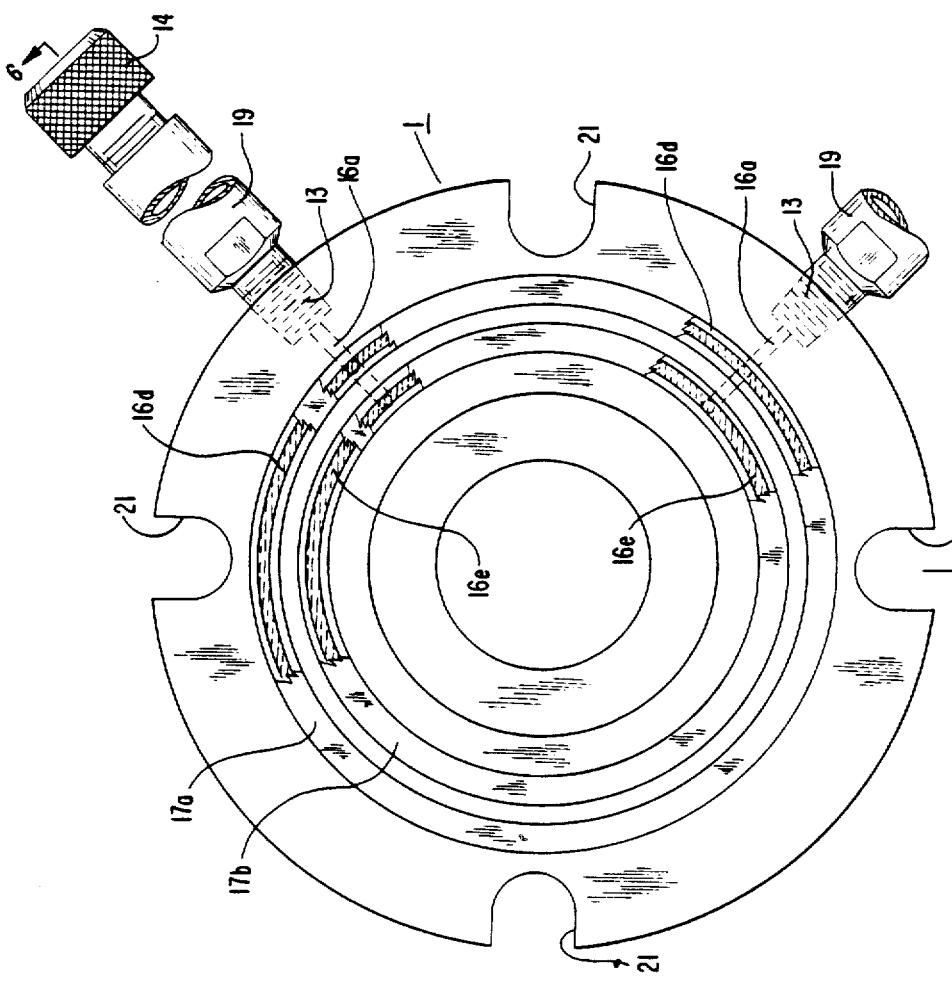

4,993,720

SELF-SEALING MECHANICAL SEAL GLAND FOR PUMPS AND OTHER MACHINERY

BACKGROUND OF THE INVENTION

This relates in general to a sealing assembly for pumps and other machinery including rotary shafts. More particularly, it relates to improvements in an "infield" cylindrical sealing gland mechanically secured to the pump housing, and disposed in coaxial stationary relation to the rotating pump shaft.

It has been found that in pump systems in which the mating surfaces of a pump casing in contact with a sealing gland are unevenly matched or corroded, there is leakage.

BRIEF DESCRIPTION OF THE INVENTION

Accordingly, it is the principal object of this invention to provide a self-aligning sealing mechanism having an improved sealing gland which creates a positive seal with the pump casing in which leakage can be substantially eliminated or greatly reduced, even when the contacting surfaces are corroded or unevenly matched.

This and other objects are realized, in accordance with the present invention, in an improvement of a self-sealing mechanical sealing gland of the general type disclosed in the self-aligning sealing means for pumps and other machinery, including rotating shafts, which is disclosed in my U.S. Pat. No. 4,832,351, issued May 23, 1989, which is incorporated herein by reference. The improvement comprises providing the contacting surface of the sealing gland with a plurality of annular grooves, of different overall radii, disposed in spaced-apart coaxial relation with the central axis, and located part way between the central axis and the periphery of the cylindrical gland. Each of the annular grooves accommodates in flush relation thereto, an O-ring, the outer surface of which is disposed to bear against the surface of the pump housing. One or more screw-threaded injection wells are drilled in a radial direction into the cylindrical sidewall of the gland, and terminate at their respective inner ends in one or more radially-directed channels which communicates with feeder channels leading to the annular grooves in which each of the O-rings are disposed. After the O-rings are in place, a viscous liquid, or a fibrous compound such as, for example, silicone gel, or a graphite packing, is pumped into and fills each of the grooves behind the O-rings in such a manner as to produce a hydraulic pressure on the O-rings as they press against the pump housing surface. When the injection of the viscous liquid or the fibrous compound is complete, filling the grooves behind both O-rings to the desired pressure, the injection well may be sealed with a screw-threaded plug. This arrangement enables the viscous liquid to be pumped into place in the annular grooves after the gland is in place against the surface of the pump housing, as needed to provide an adequate seal, depending on the condition of the contacting surfaces.

One embodiment comprises a pair of annular grooves, spaced-apart, which are fed with viscous liquid from the same injection well. In a modified embodiment a third annular groove, disposed between the other two, is fed from a separate injection well. In this particular design the third central groove could be filled with the fibrous packing compound.

This device has the advantage of pressing the sealing gland in mating relation against the surface of the pump housing, notwithstanding irregularities or corrosion of the mating surfaces.

Other objects, features and advantages of the invention will be apparent from a study of the specification hereinafter with reference to the appended drawings.

BRIEF DESCRIPTION OF THE DRAWINGS

FIG. 5 is a plan view of the gland of FIG. 1 with the pair of gaskets of rectangular cross-section in place, partially broken away to show the presence of the viscous liquid, showing the injection pumps in place on two injection wells.

FIG. 6 is a section through the plane indicated by the arrows 6—6 of FIG. 5, showing the injection pump in place in one of the injection wells, showing viscous liquid in the channels, and showing solid elastomer O-rings in place in each of the annular grooves.

Figure 8:
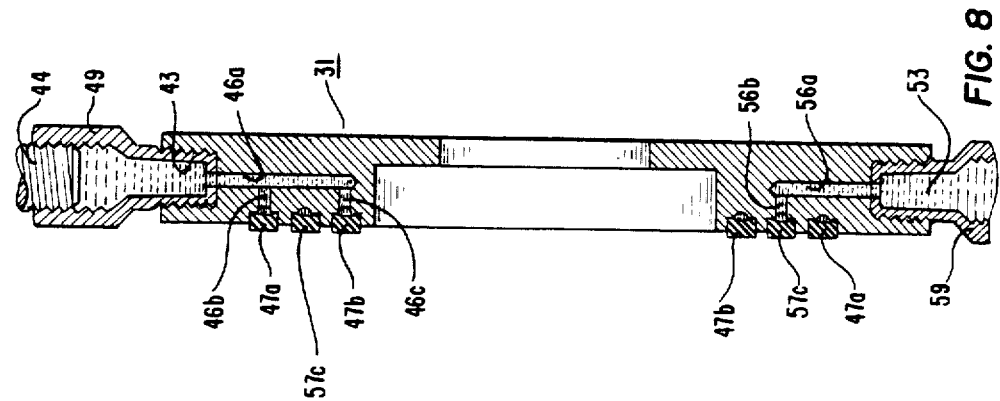
FIG. 8 is a sectional view of the modified embodiment of FIG. 7 taken along the plane indicated by the arrows 8—8 of FIG. 7.
Figure 10:
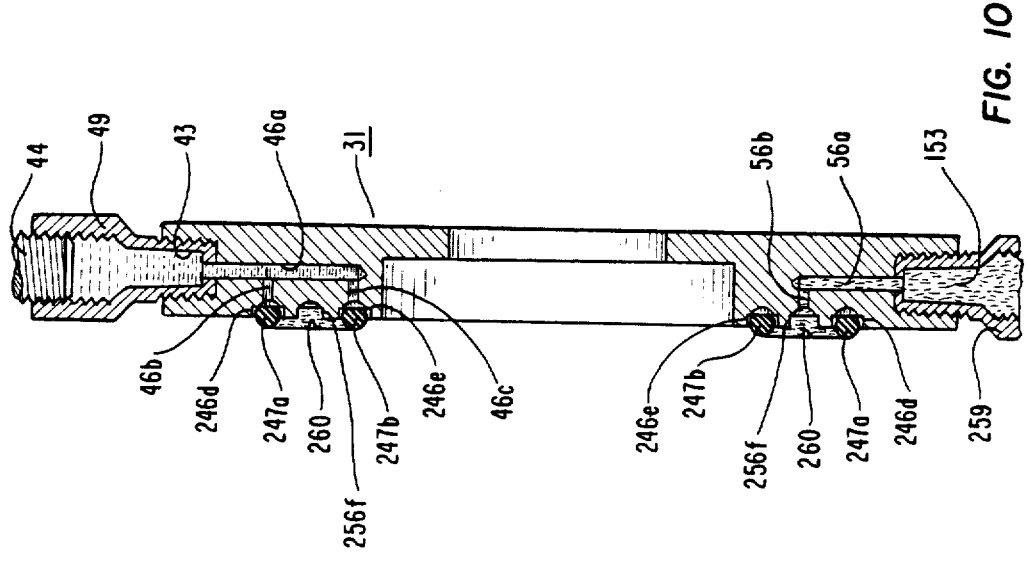
FIG. 10 is a sectional view of an alternate embodiment where the cross-section of the O-rings is round and the cross-section of the grooves is rectangular.
Figure 9:
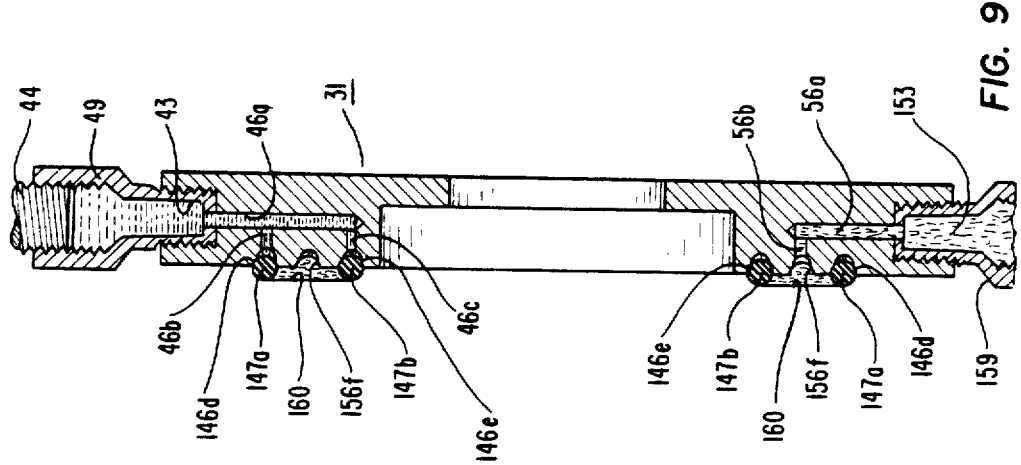
FIG. 9 is a sectional view of an alternate embodiment where the cross-sectional shape of the grooves and the O-rings is round.

The reference characters in FIGS. 9 and 10 are the same for common elements as those in FIG. 8.

DETAILED DESCRIPTION OF THE INVENTION

Figure 1:
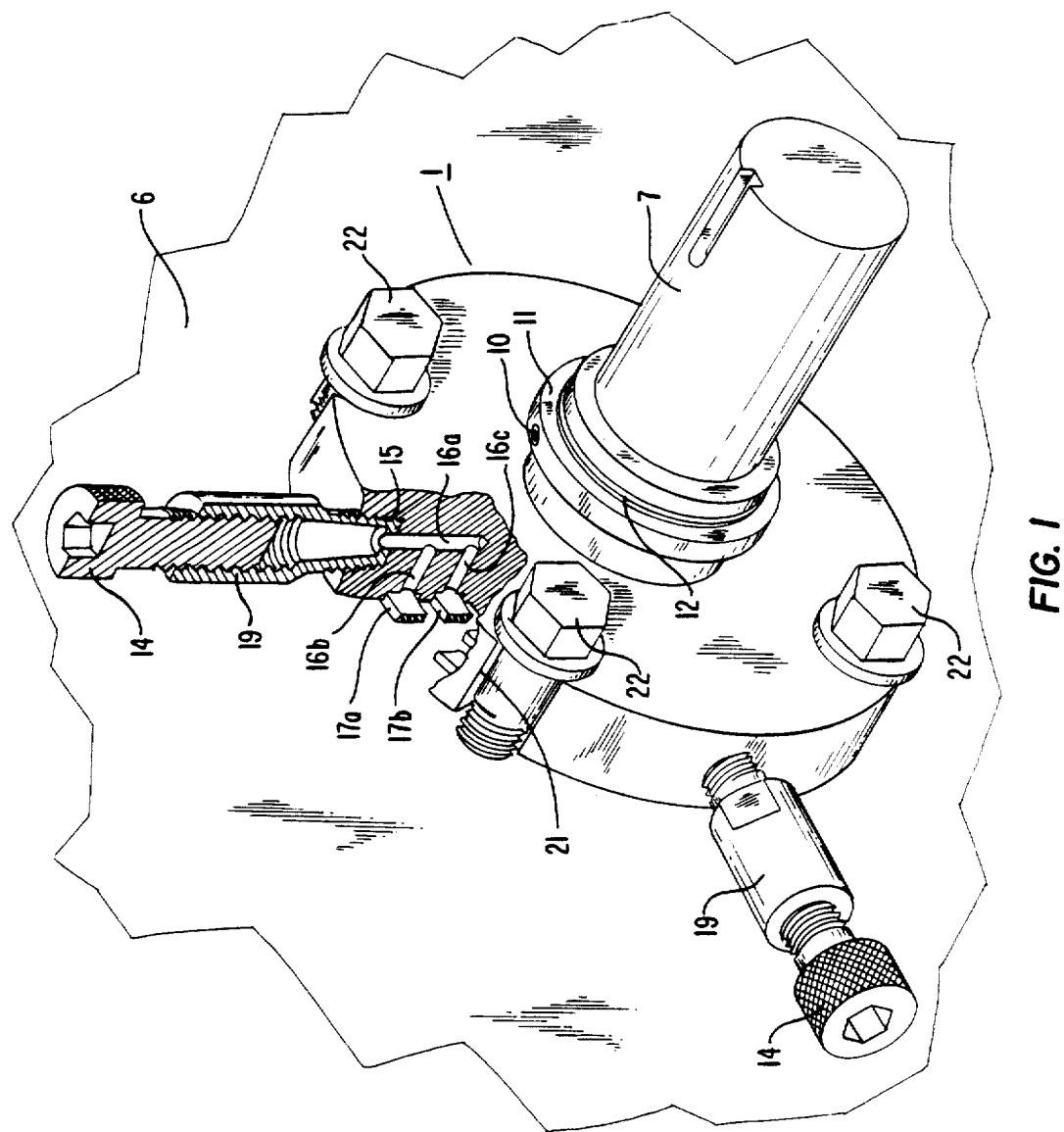
FIG. 1 is a perspective showing of a cylindrical "infield" sealing gland in accordance with one embodiment of the present invention, comprising a pair of coaxial annular grooves fed from a single injection well, which is partially broken away to show gaskets for creating a positive seal with the pump housing, and a system of internal channels and pumping means for supporting the gaskets, with an annular cushion of viscous liquid, or fibrous compound.

Referring to FIG. 1 there is shown, in perspective, a pump shaft assembly which includes an infield sealing gland 1, fastened to fixed pump housing member 6, in a central bore in which a pump shaft 7 is journaled to rotate, being driven to rotate by conventional means, not shown. Gland 1 is fixed to the face of the pump housing 6 in the present embodiment by four bolts 22, which are interposed parallel the axis through four longitudinal notches 21 equally spaced-apart around its periphery.

Figure 2:
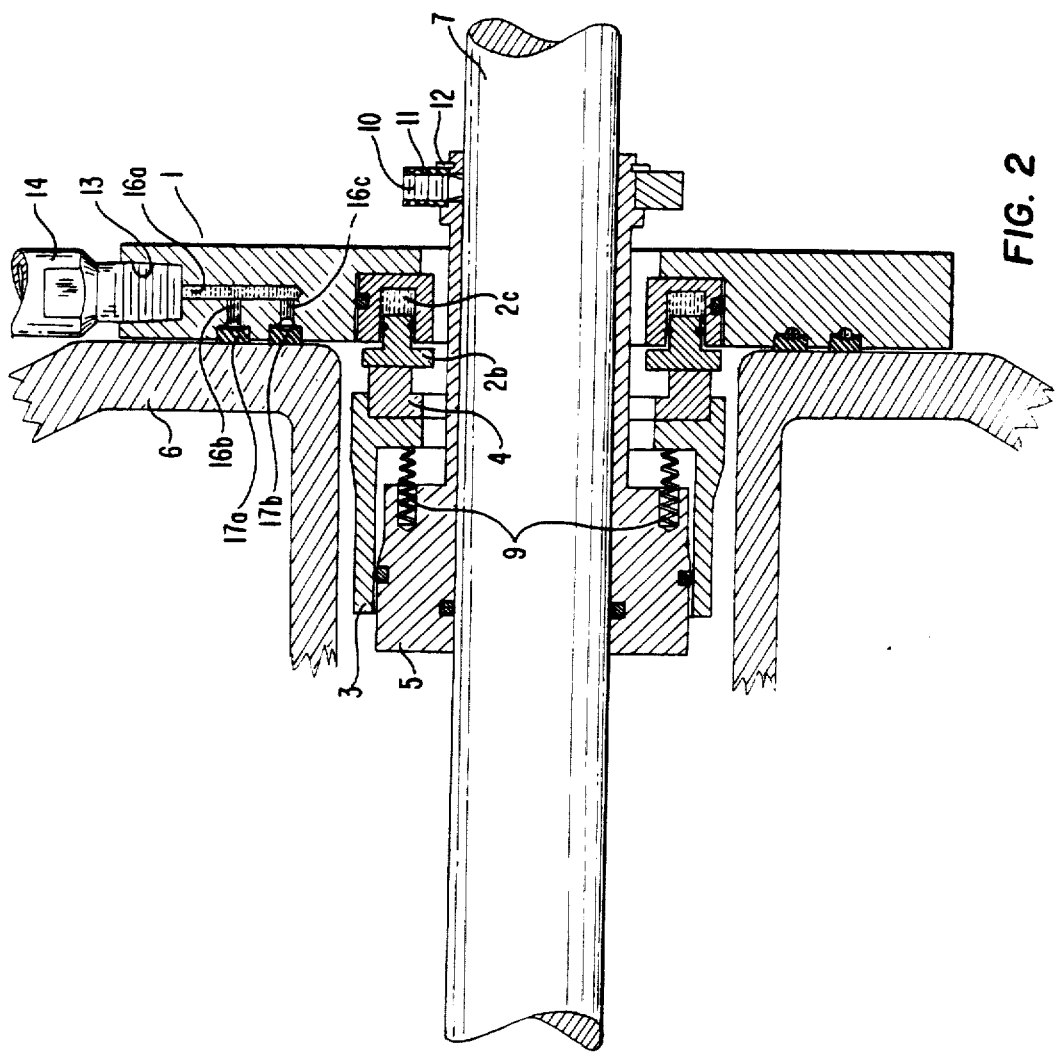
FIG. 2 shows, in diametrical section, the cylindrical "infield" sealing gland of the embodiment, in accordance with FIG. 1, secured to a pump housing, in an annular cavity of which is enclosed a pump seal assembly, including a self-aligning stationary composite disclosed in my U.S. Pat. No. 4,832,351, supra.

Referring to the sectional showing in FIG. 2, the pump shaft 7 has an annular rotor 3 which is fixed to the periphery of the pump shaft 7 and rotates therewith. The rotor 3 is held under compression by conventional means, such as by coil spring 9 in collaboration with the set screws 10, the collar 11, and the lock ring 12. This causes the seal face 4, and shank 2b which floats on the silicone gel 2c, to bear against each other as the shaft 7 rotates. This is a self-aligning sealing system which is described in more detail in my U.S. Pat. No. 4,832,351 supra.

The unique feature of the system of my present invention under description, is the gland 1, which in the presently described embodiment is formed of stainless steel, of general cylindrical form, say 7¾ inches in outer diameter, and 1 inch thick in an axial direction, and has one or more annular grooves engraved on its inner face. It will be understood that the gland 1 may assume many different dimensions depending on the pump size.

Adjacent to the interface of pump housing 6, the gland 1 has an inner diameter of, say, 5 inches, forming a chamber which extends about ½ inch in an axial direction to an internal shoulder, where the inner diameter is stepped back to 3½ inches, extending therefrom about ½ inch in axial depth.

The central internal annular recess of the gland 1 houses the annular cavity 2c filled with silicone gel, in which rides the shank of the annular ring 2b, forming a self-aligning sealing coupling during rotation, as explained in my U.S. Pat. No. 4,832,351, supra.

Figure 4:
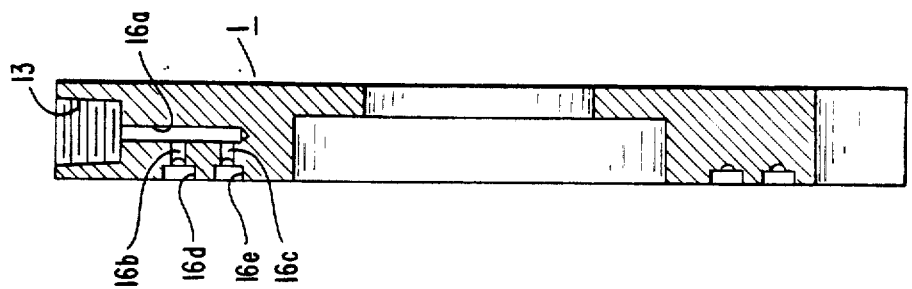
FIG. 4 is a sectional view of the gland of FIG. 1 along a plane shown by the arrows 3—3 of FIG. 2, taken through one of the injection wells, and a fastening notch.
Figure 3:
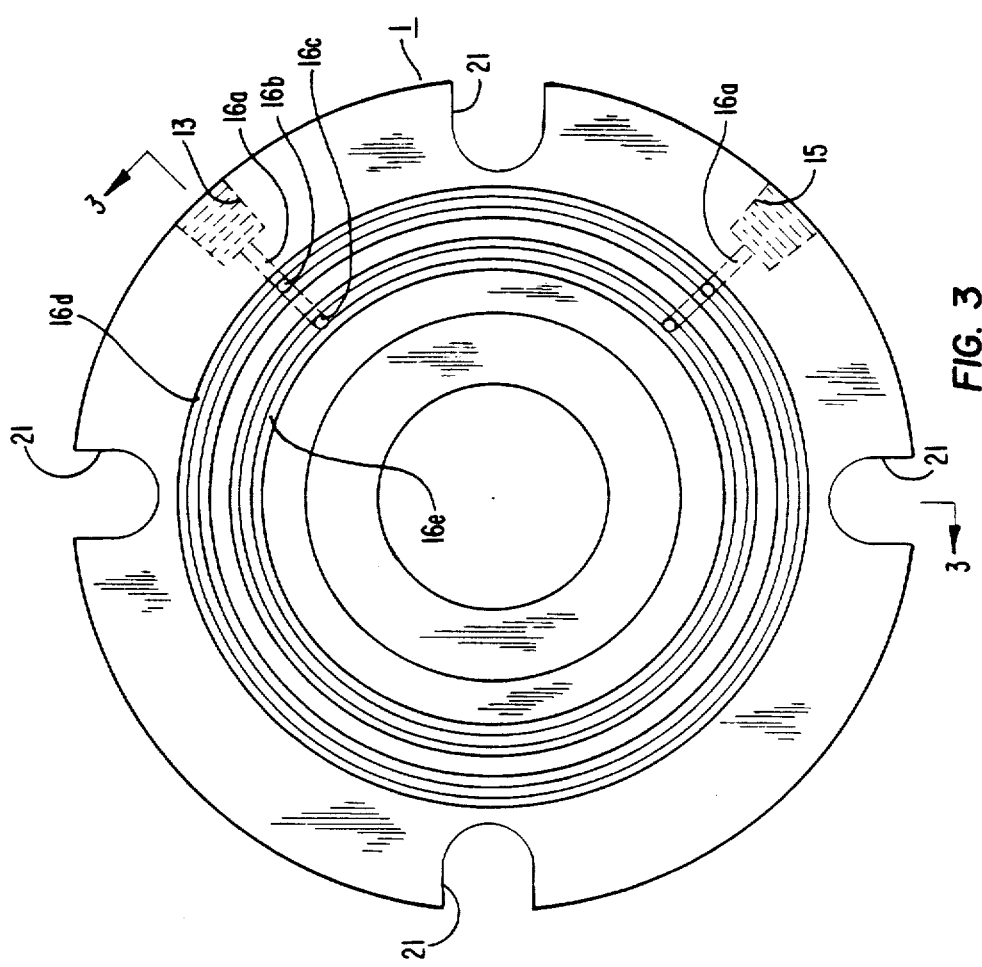
FIG. 3 is a plan view of the gland of FIG. 1, showing the pair of annular grooves fed from two injection wells.

In one embodiment of the present invention, as shown in FIG. 3, in plan view, and in FIG. 4 in section, the gland 1 has engraved on its inside face a pair of annular grooves 16d and 16e, each of rectangular cross-section, say, ⅛ inch by ⅛ inch, although these grooves may alternatively be of circular section, say ⅛ inch in diameter or other dimensions, depending on the size of the gland. The inner annular groove 16e is 5⅞ inches in outer diameter; and the outer annular groove 16d is 6⅜ inches in outer diameter, each being ⅛ inch across the face, the annular spacing between them being about 3/16 inch.

Interposed into the circular sidewalls of the gland 1, in this embodiment, in two positions about 90 degrees apart around the periphery, are a pair of screw-threaded injection wells 13 and 15. These are each ⅜ inch in diameter and, say, ⅜ inch deep, and terminate at their lower ends in radially-directed channels 16a of circular section, which in the present embodiment is, say, just in excess of ⅛ inch in diameter. Each, respectively, intersects at right angles, the channels 16b and 16c, which lead into the annular grooves 16d and 16e, all of which are just exceeding ⅛ inch in depth and width, in the present embodiment. It will be understood that these grooves can be circular in section, and dimensioned according to the size of the glands, in alternative embodiments.

FIGS. 5 and 6, respectively, show gland 1 in plan view and in section, in the process of being pumped full of a viscous liquid, from the channels 16a, through connecting channels 16b and 16c to annular grooves 16d and 16e. The pump 14 is screwed into the injection well 13, or alternatively, into injection well 15. The O-rings 17a and 17b, which may be, for example, of an elastomer manufactured under the trademark VITON, in the present example, are of rectangular section ⅛ inch square. In any case, they are dimensioned to fit into snugly, and completely seal the channels 16d and 16e. If the latter are of circular cross-section, O-rings 17a and 17b will also be of circular cross-section.

The viscous liquid is forced into the grooves 16d and 16e until they are completely filled, and a pressure is imposed on the undersides of the sealing O-rings 17a and 17b, forcing them against the face of pump casing 6, in sealing relation. When the operation has been completed, the viscous liquid injection pump 14, may be removed, and conventional screw plugs (not shown) may be interposed into injection wells 13 and 15. Alternatively, the injection pump 14 may be left in place to provide additional liquid elastomer as needed during the pumping operations.

Any type of viscous liquid or liquid elastomer which can be pumped into place may be useful for the purposes of this invention. One example is a silicone gel; or any gel or lubricant of similar characteristics, may be used to fill the grooves 16d and 16e. Alternatively, it will be understood that a fibrous compound, such as graphite packing, can be substituted for the viscous liquid.

Figure 7:
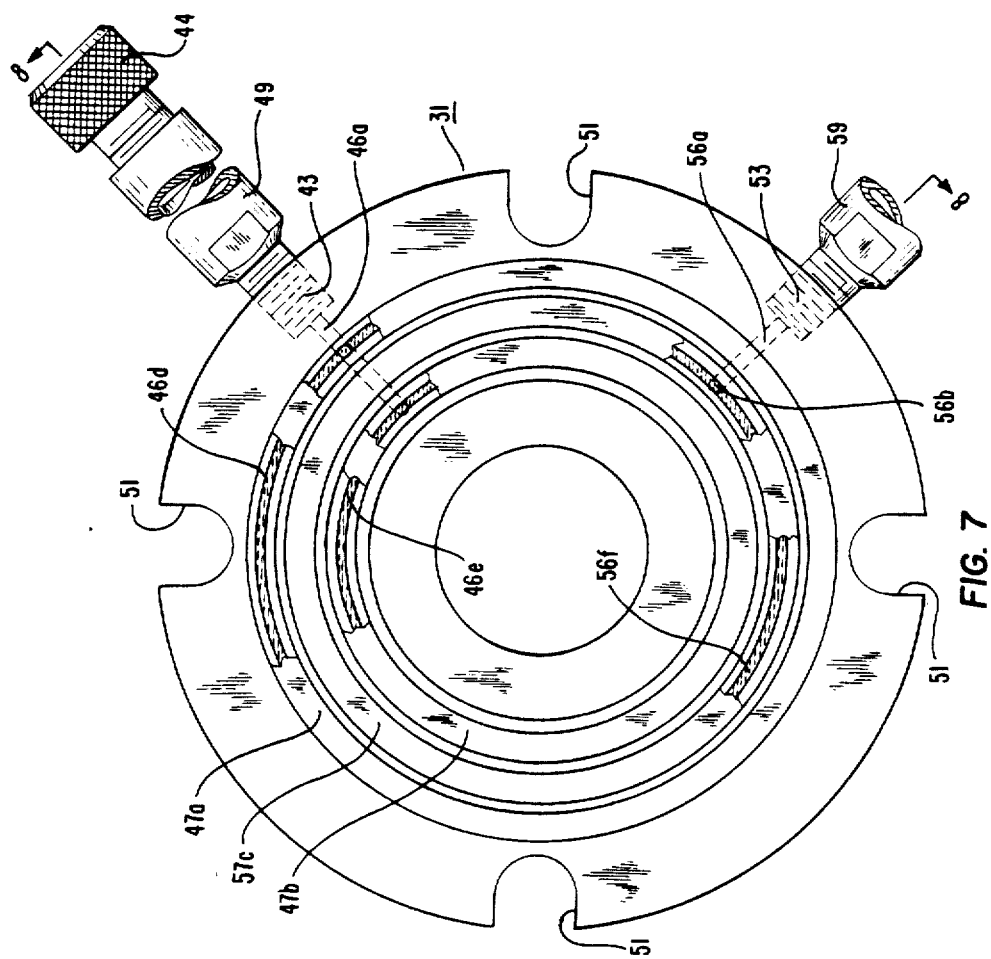
FIG. 7 is a plan view of a modified embodiment of the present invention including three coaxially-disposed annular grooves, the inner and outer annular grooves being fed from one injection well, and the central annular groove being fed from a separate injection well.

Referring to FIGS. 7 and 8 there is shown a modification 31 of the gland 1 of FIGS. 1-6, wherein a third annular groove 56f is engraved on the inner face of the gland 31, between and coaxial with inner and outer annular grooves 46d and 46e. It will be understood that for ease of description 30 has been added to each of the identifying numbers of the previously described embodiment of FIG. 1-6; and unless otherwise indicated, elements with similarly numbered digits are substantially as previously described.

In the embodiment under description, the outer annular groove 46d is 6 11/16 inches in outer diameter, and the inner annular groove 46e is 5 13/16 inches in outer diameter, and the outer diameter of the third annular groove 56f, which is centered between annular grooves 46d and 46e, is 6¼ inches in diameter. The cross-sectional dimensions of each of these grooves are as previously described including being of either circular or rectangular section as previously noted as options for the shape of the grooves.

The annular O-rings 47a, 47b and 57c, which are rectangular in section in this embodiment, are respectively dimensioned as previously described, to fit into each of the annular grooves 46d, 46e and 56f.

FIG. 9 illustrates an embodiment wherein the cross-sectional shape of grooves 146d, 146e and 156f are round and the cross-sectional shape of O-rings 147a and 147b are correspondingly round.

FIG. 10 illustrates an embodiment where the cross-section of O-rings 247a and 247b are round and the cross-section of grooves 256d, 246e and 256f are rectangular.

The outer and inner annular grooves 46e and 46d are both fed by injector 49 from the injection well 43 through a system of channels including channel 46a, 46b and 46c, respectively.

Central groove 56f is fed independently by injector well 59, through injection well 53, and channels 56a and 56b. Thus, when the viscous liquid is pumped separately from injection well 43 into grooves 46d and 46e, and from injection well 53 into central groove 56f, a tighter seal is maintained as the gland 31 rides against the face of the pump housing.

As previously indicated, a fibrous compound, such as a graphite packing material, can be substituted for the viscous liquid. As an alternative, it is contemplated that the fibrous packing material can be used in any or all of the grooves 46d, 46e and 56f with or without the respective O-rings 47a, 47b and 57c.

FIGS. 9 and 10 illustrate embodiments, each having a pair of annular grooves spaced apart which are fed with a viscous liquid from the same injection well. In FIG. 9 these are grooves 146d and 146e and in FIG. 10, grooves 246d and 246e. A third annular groove (156f in FIG. 9, and 256f in FIG. 10), is disposed between the other two grooves. The third or central annular groove in each embodiment is fed from a separate injection well (159 in FIG. 9, and 259 in FIG. 10). The central groove, opposite the fixed mating surface (160 in FIG. 9 and 260 in FIG. 10), can be filled with a fibrous packing compound 153.

It will be understood that this invention is not limited to the structures and components shown herein by way of example, but is defined in accordance with the appended claims.

What I claim is:

1. A cylindrical gland constructed to be used in coaxial relation to a rotatable shaft of a pump shaft assembly having a fixed pump housing;

said gland comprising means for securing a substantially flat surface of said gland in face-to-face relation against a fixed mating surface of said pump housing;

said gland including three annular grooves engraved on said substantially flat surface in concentric and coaxial relation with the principal axis of said gland, there being two outer grooves and a central groove between the two outer grooves, each groove having an annular bottom within the gland spaced from and facing the fixed mating surface;

means comprising an O-ring of elastomeric material dimensioned to seat securely in each of said outer grooves, each O-ring having an inner surface facing the respective bottom of the groove in which the respective O-ring is inserted and having an outer surface facing the fixed mating surface;

means for interposing a viscous liquid into said outer grooves between the inner surface of said O-ring and the bottom of said groove so that a portion of the outer surface of said O-ring is compressed against the fixed mating surface of said pump housing; and means constructed for supplying a desired quantity of a fibrous compound to the central groove, being separate from the means for interposing a viscous liquid, the fibrous compound being in sealing contact between the gland surface and the fixed mating surface of the pump housing.

2. The combination in accordance with claim 1 wherein each of said O-rings comprises a solid elastomer.

3. The combination in accordance with claim 2 wherein the cross sectional shape of each of said grooves is rectangular, and the cross-sectional shape of each of said O-rings is rectangular, and of matching dimensions, to fit in sealing relation into each of said respective grooves.

4. The combination in accordance with claim 2 wherein the cross sectional shape of each of said grooves is round, and the cross sectional shape of each of said O-rings is round, and of matching dimensions, to fit in sealing relation into each of said respective grooves.

5. The combination in accordance with claim 1 wherein said O-rings are formed of an elastomer manufactured and sold under the trademark VITON.

6. The combination in accordance with claim 1 wherein said viscous liquid is a liquid silicone elastomer.

7. The combination in accordance with claim 1 wherein a plurality of injection wells are interposed in spaced-apart relation around the periphery of the lateral surface of said gland, one of said wells for supplying viscous liquid being connected by communicating channels to said outer annular grooves, and another one of said wells for supplying a fibrous compound being connected by communicating channels to the central groove.

* * * * *